(12) United States Patent
Mihm, Jr. et al.

(10) Patent No.: US 7,519,830 B2
(45) Date of Patent: Apr. 14, 2009

(54) SECURE STORAGE OF DATA

(75) Inventors: Thomas J. Mihm, Jr., Crystal Lake, IL (US); Eric R. Uner, Carpentersville, IL (US)

(73) Assignee: Motorola, Inc., Schaumburg, IL (US)

( * ) Notice: Subject to any disclaimer, the term of this patent is extended or adjusted under 35 U.S.C. 154(b) by 364 days.

(21) Appl. No.: 11/462,155

(22) Filed: Aug. 3, 2006

(65) Prior Publication Data

US 2008/0046737 A1 Feb. 21, 2008

(51) Int. Cl.
*G06F 12/14* (2006.01)
*G06F 7/04* (2006.01)

(52) U.S. Cl. .......................... 713/187; 713/193; 726/26; 726/30

(58) Field of Classification Search .................. None
See application file for complete search history.

(56) References Cited

U.S. PATENT DOCUMENTS 6,711,683 B1  3/2004  Laczko, Sr. et al.

2002/0099948 A1  7/2002  Kocher et al.
2003/0163718 A1  8/2003  Johnson et al.
2003/0200448 A1  10/2003  Foster et al.

OTHER PUBLICATIONS

WIPO-ISA, Copy of PCT Search Report.

*Primary Examiner*—Minh Dieu Nguyen
*Assistant Examiner*—David J Pearson

(57) ABSTRACT

A secure memory system binds an encrypted first data value stored in a memory with a state of the memory by selecting, at random, an address in the memory and mixing a second data value, stored at the address, with a hash value of the first data value to produce a split value. The address, split value and first data value are encrypted and stored in the memory. To detect tampering of the memory, the encrypted address is decrypted and the corresponding value read from the memory and used to recover a hash value from the decrypted split value. The recovered hash value is then compared with the original hash value.

19 Claims, 5 Drawing Sheets

US 7,519,830 B2

SECURE STORAGE OF DATA

BACKGROUND

In electronic devices, critical data, such as time stamps, counters or other state values, is often stored in the general system non-volatile memory (NVM). FLASH memory is an example of non-volatile memory. This makes the data vulnerable to tampering. Encrypting the data before storage does not solve the problem because an encrypted value could be copied and used to overwrite a new encrypted value at some later date, thereby resetting the data value to a previous state.

Physical tamper protection, such as storing values in non-volatile memory that is on the application processor provides a solution, but is difficult to implement and expensive. Thus, this approach is impractical for commercial electronic devices. This approach has been used in so-called Smartcards, in which critical data is stored in non-volatile memory located on the same substrate as the main processor. However, application processors on mobile devices do not have on-board non-volatile memory, so the state data values must be stored in external non-volatile memory.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
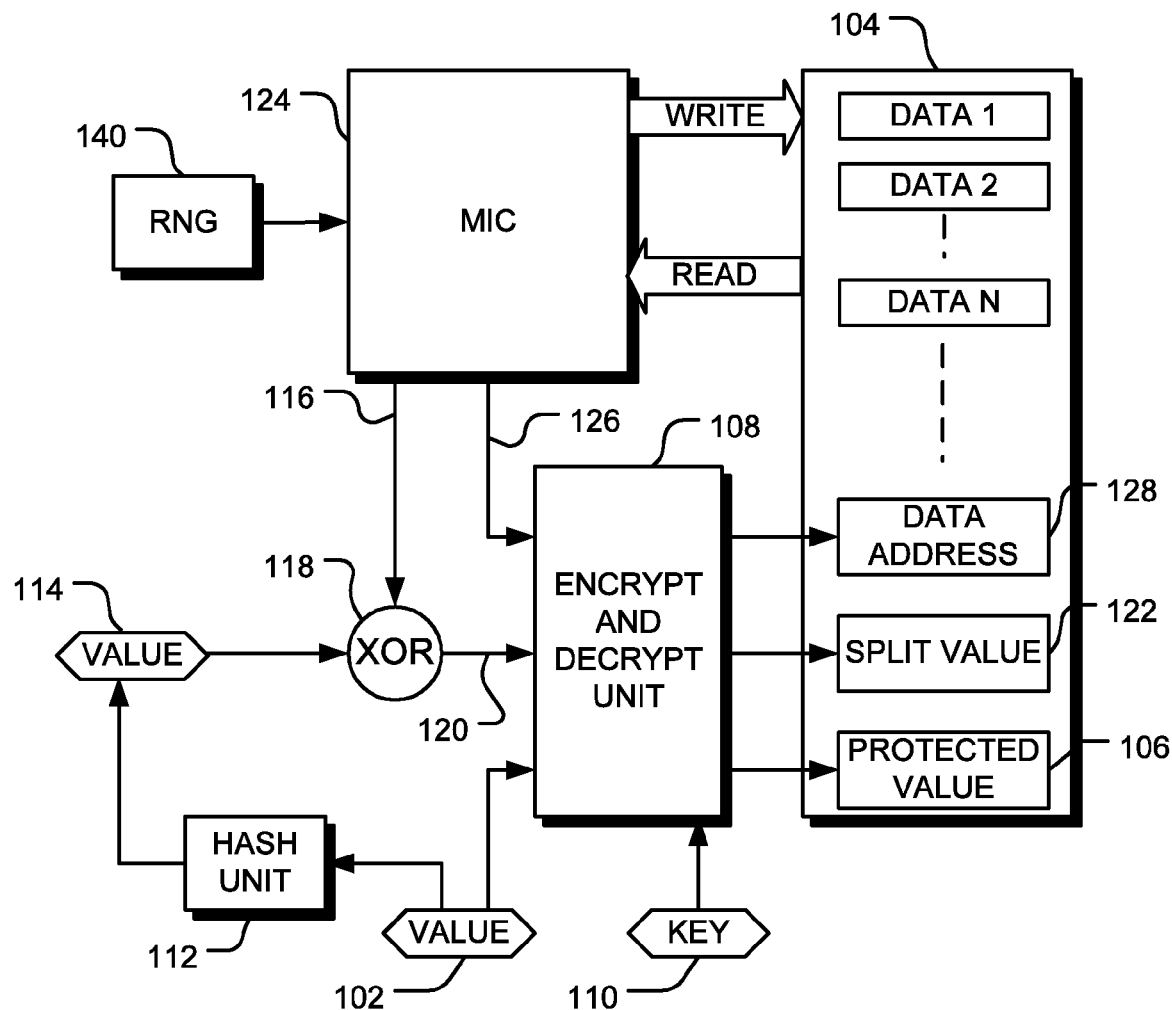
FIG. 1 is a block diagram of a system for secure storage of data consistent with certain aspects of the invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

In accordance with an embodiment of the invention, a secure memory system binds an encrypted first data value stored in a memory with a state of the memory by selecting, at random, an address in the memory and mixing a second data value, stored at the address, with the hash value of the first data value to produce a split value. The address, split value and first data value are encrypted and stored in the memory. To detect tampering of the memory, the encrypted address is decrypted and used to find the corresponding second data value. The second data value is read from the memory and used to recover the hash value from the decrypted split value. This recovered hash value is then compared with a newly generated hash value, made by decrypting the first data value and using it to generate the new hash value. If tampering has occurred the two hash values will not match.

FIG. 1 is a block diagram of a system for secure storage of data consistent with certain aspects of the invention. Referring to FIG. 1, the system 100, allows a data value 102 to be stored in a non-volatile memory 104 of an electronic device as a protected value 106. The data value is referred to as a critical data value in this example but may be any data value. The non-volatile memory 104 may be a FLASH memory, for example. The protected value 106 is obtained by encrypting the critical value 102 in an encryption and decryption unit 108. The encryption and decryption unit 108 may comprise separate encryption and decryption units, or a combined encryption and decryption unit. The unit may use an encryption key 110 that is unique to the electronic device. The encryption key may be, for example, derived from a Secure Laser Identification Number (SLID) that is laser inscribed on each integrated circuit during manufacture of the application processor. The SLID is unique to the processor and is not revealed off-chip. The SLID cannot be discovered without physical penetration of the integrated circuit. The encryption unit may utilize a cryptographically strong function, such as the symmetric key technique defined in the Advanced Encryption Standard (AES).

In order to determine if the memory has been tampered with, the critical date value is passed to hash unit 112 that provides a hash value 114 of the critical data value. The hash unit may use a known Secure Hash Algorithm (SHA) for example. This value is combined with a data value 116 in mixing unit 118. The mixing unit 118 may be an XOR unit, for example, as shown in the figure. The result of the mixing is a split value 120 that is encrypted in encryption unit 108 and stored as an encrypted split value 122. The data value 116 is obtained by randomly selecting a value in the memory interface controller (MIC) 124. A random number generator 140 may be used to enable the random selection. The address 126 of the randomly selected data value is also passed to the encryption and decryption unit 108, where it is encrypted. The encrypted address 128 is saved in the non-volatile memory 104. Once both the encrypted split value 122 and the encrypted address 128 are stored in the non-volatile memory 104, the hash value 114 of the data value is discarded.

Thus, in addition to the data value, a mixture of the hash of the data value with a data value selected at random from the non-volatile memory (a split value), together with the address are all encrypted and stored. The randomly selected data value itself remains in its original memory location. Once the address value that references the randomly selected data value has been encrypted, the location of the data value is hidden.

Figure 2:
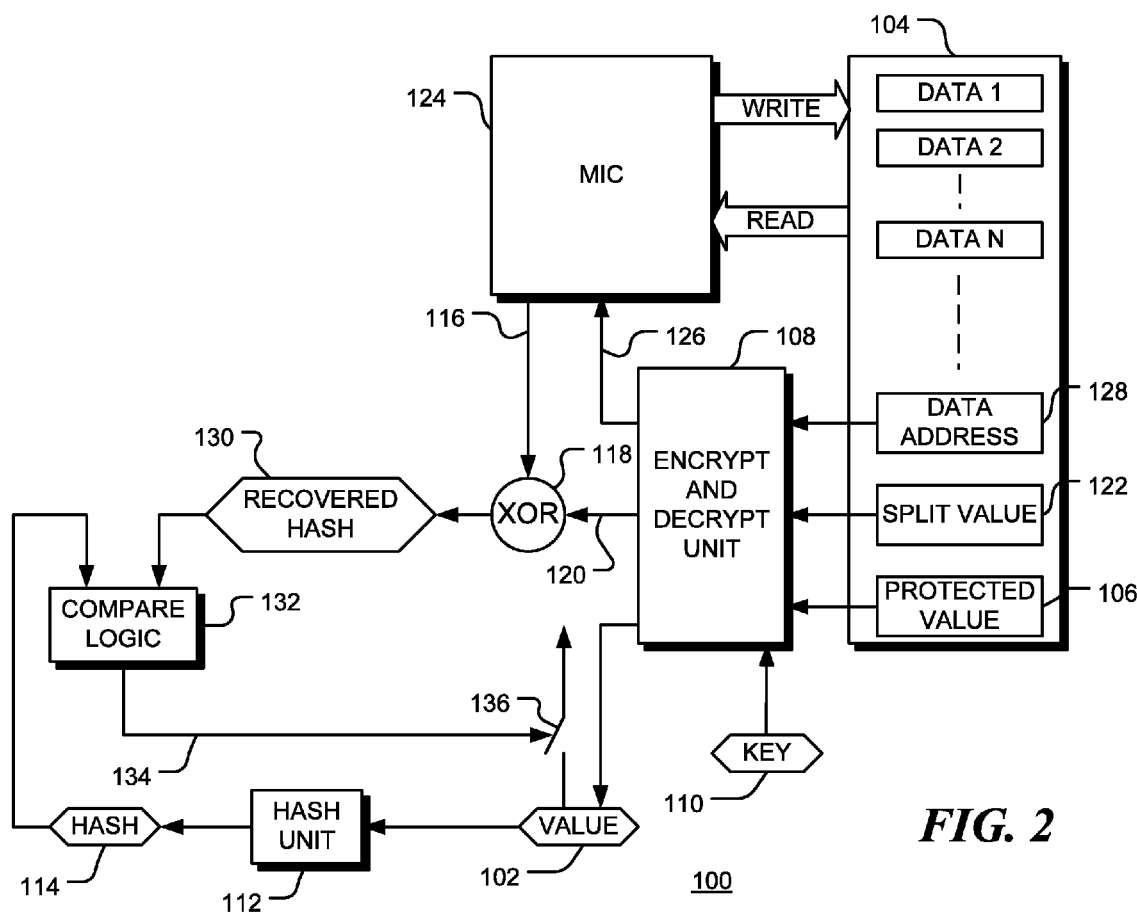
FIG. 2 is a block diagram of a system for secure recovery of data consistent with certain aspects of the invention.

FIG. 2 is a block diagram of a system for secure recovery of the critical data value (or other protected data value) consistent with certain aspects of the invention. Referring to FIG. 2, to detect tampering of the non-volatile memory, the encrypted split value 122 is read from the non-volatile memory 104 and decrypted, in the encryption and decryption unit 108, to recover the split value 120. The encrypted data address 128 is read from the non-volatile memory 104 and decrypted to recover the address 126. The address 126 is passed to the MIC 124 to enable the randomly selected data value 116 to be recovered from the non-volatile memory 104. The recover data value 116 is used to separate (un-mix) the split value 120 to recover the original hash value 130 of the critical data value 102. The encrypted critical data value 106 is read from the non-volatile memory 104 and decrypted in the encryption and decryption unit 108 to produce value 102. The value 102 is used by the hash unit 112 to create a new hash 114. This new hash value 114 is compared with the recovered original hash value 130 in comparison logic unit 132. If the values match, the line 134 is asserted to indicate the recovered value 102 can be trusted. This is indicated in FIG. 2 be the switch 136 activated by the assert line 134.

However, if the encrypted protected value 106 has been overwritten with a previous value (and even if the split value and data address have also be overwritten), the retrieved data value 116 is unlikely to agree with the data value used to create the split value. In this case, the recovered hash value will not match the newly generated hash value, and line 134 will be de-asserted to indicate tampering.

Figure 3:
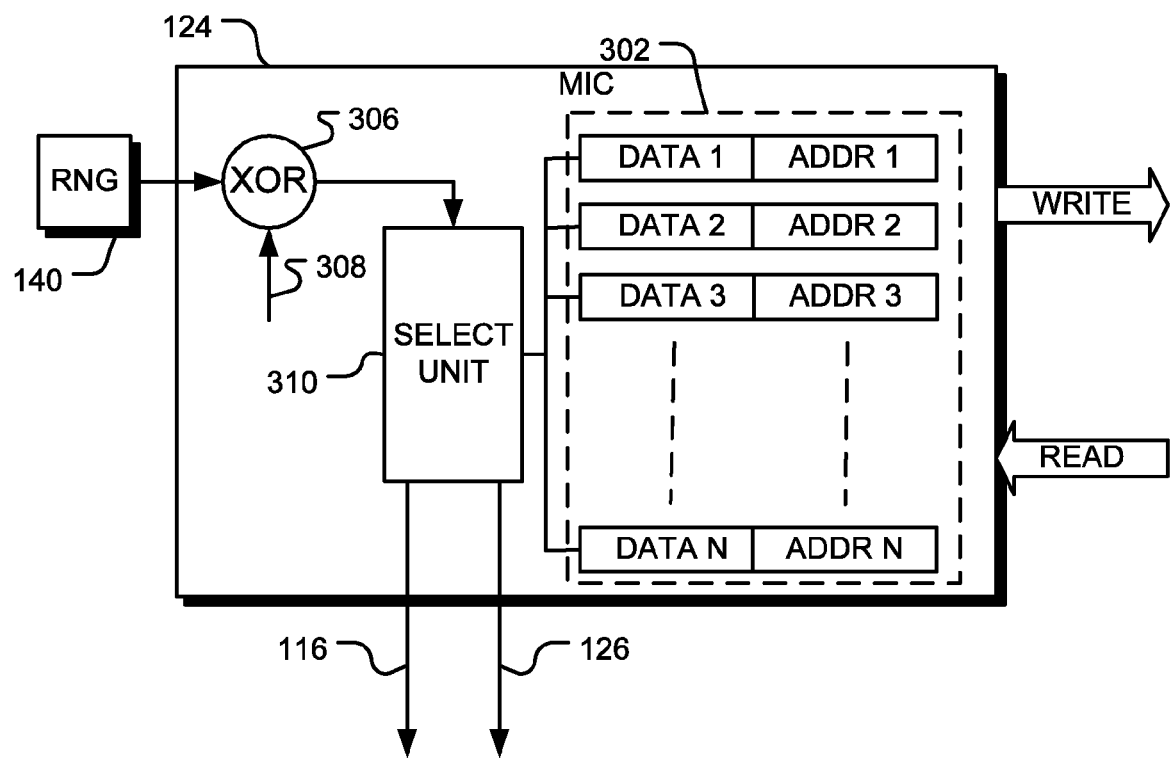
FIG. 3 is a block diagram of a memory interface controller consistent with certain aspects of the invention.

FIG. 3 is a block diagram of an exemplary memory interface controller (MIC) consistent with certain embodiments. The memory interface controller 124 includes a circular RAM buffer 302 that holds the data values, and corresponding addresses, about to be written to the non-volatile memory. As data values change as part of normal operation of the electronic device, a record of changed data and their corresponding addresses in the non-volatile memory are placed in the circular buffer. The output of a random number generator (RNG) 140 is combined in XOR unit 306 with an address mask 308. This provides a random address in the circular RAM buffer 302. A select unit 310 receives the random address and selects the data value 116 and the non-volatile memory address 126 stored at the random address in the circular RAM buffer and outputs them.

Figure 4:
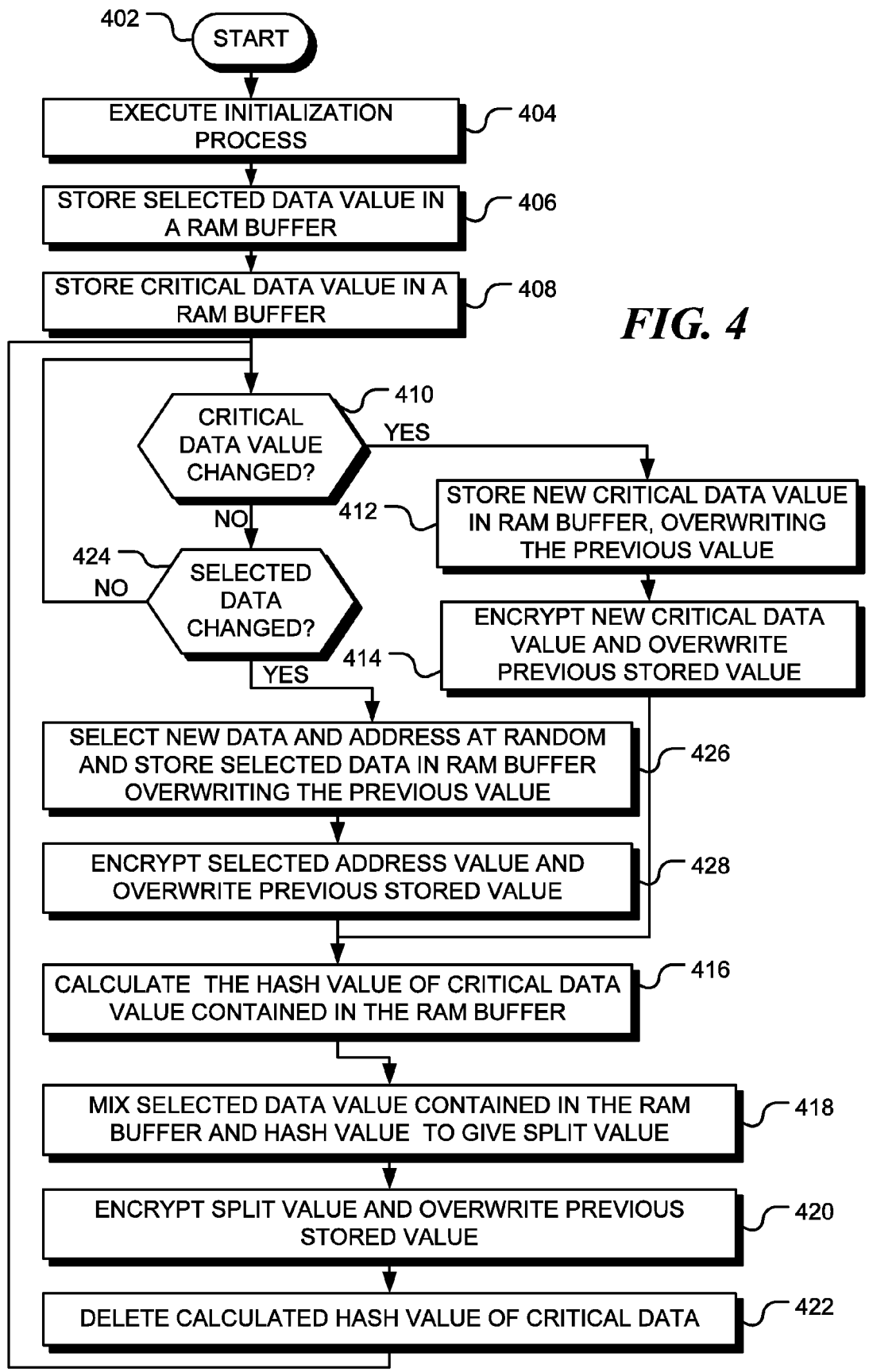
FIG. 4 is a flow chart of a method for securely storing data in a memory consistent with certain aspects of the invention.

FIG. 4 is a flow chart of a method for securely storing data in a memory consistent with certain aspects of the invention. Following start block 402 in FIG. 4, an initialization process 404 retrieves a randomly selected data value and the critical data value from non-volatile memory storage. An example of an initialization process is described below and shown in FIG. 5. The randomly selected data value and the critical data value may be placed in a buffer in random access memory (RAM), at block 406 and 408 respectively, where both may be quickly accessed while the device is operational. It is noted that the initialization process 404 could be run each time a change to either the selected data value or the critical data value is required. However, one approach is to retrieve both values from non-volatile memory storage and place them in a buffer in RAM. It is assumed that the RAM buffers only allow authorized processes to access the data values.

When a change to the critical data value occurs as part of the normal operation of the device (for example if the critical value was a counter and it was incremented by one count) decision block 410 branches to block 412 that overwrites the previous critical data value with the new value in the RAM buffer. At block 414 the new critical data value is encrypted and overwrites the previous value in non-volatile memory. A new hash value is calculated at block 416 for the new critical data value. The new hash is mixed with the selected data value in block 418 to create a new split value. The values may be mixed using an XOR operation for example. At block 420 the new split value is encrypted and placed in the non-volatile memory by overwriting the previous value. The hash value is then deleted from RAM memory by block 422.

When a change to the randomly selected data value occurs, decision block 424 branches to block 426 that randomly selects a new address. Block 426 then reads the data at the new selected address and places it in the RAM buffer by overwriting the previous selected data value. The new selected data address is encrypted at block 428 and is placed in non-volatile memory by overwriting the previous value. A hash value of the critical data value is calculated by block 416 and is mixed with the new data value in block 418 using an XOR operation for example, to create a new split value. Block 420 then encrypts the new mix value and places it in non-volatile memory by overwriting the previous value. The calculated hash value is then deleted at block 422.

Figure 5:
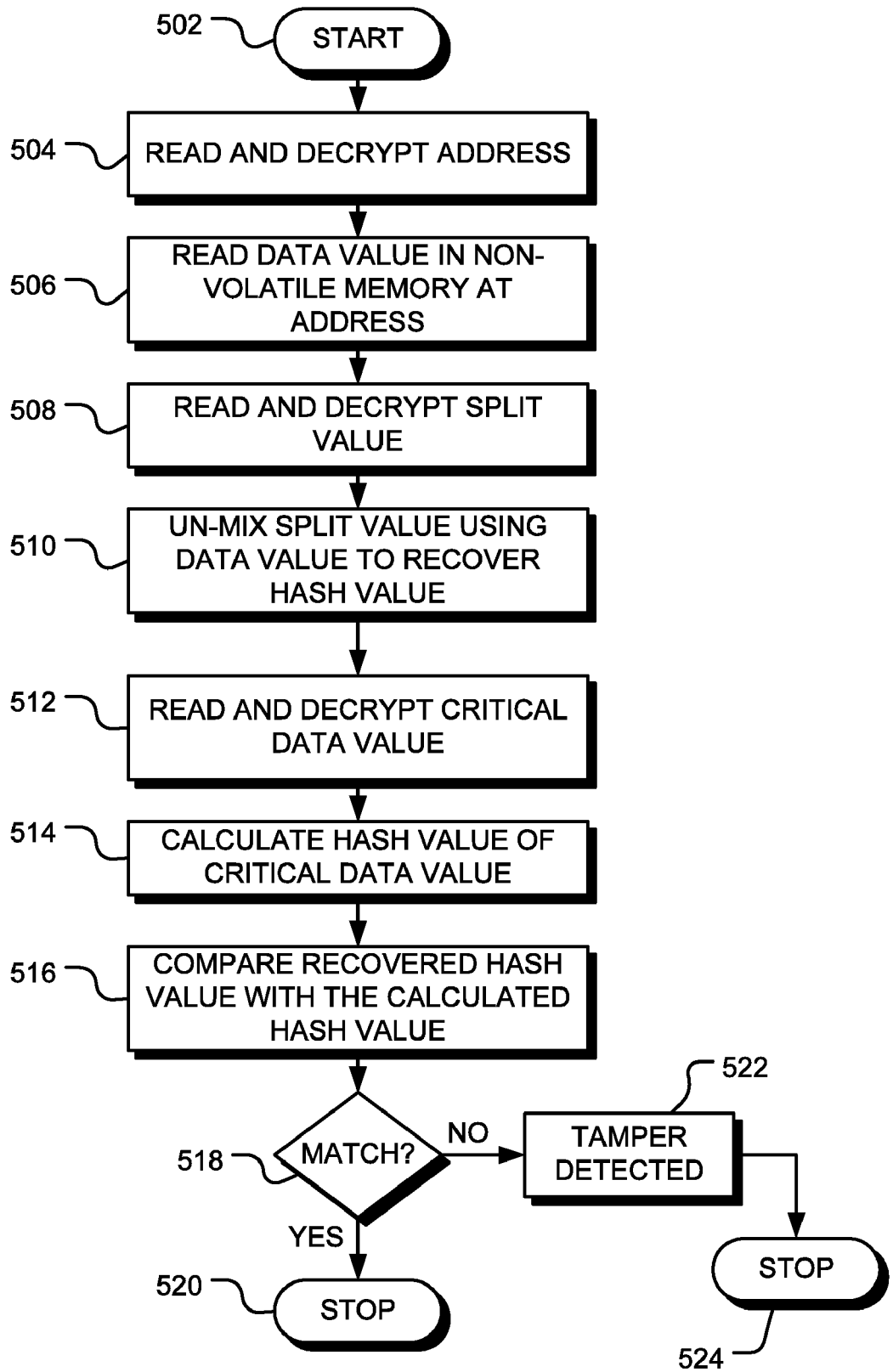
FIG. 5 is a flow chart of a method for validating stored data in a memory consistent with certain aspects of the invention.

FIG. 5 is a flow chart of a method for retrieving and validating stored data in a memory consistent with certain aspects of the invention. Following start block 502 in FIG. 5, the encrypted address is read from the memory and decrypted at block 504. The decrypted address is used to read the corresponding data value stored at the address in the memory at block 506. At block 508, the encrypted split value is read from the memory and decrypted. At block 510, the data value is used to un-mix the split value so as to recover the stored hash value of the critical data value. If an XOR operation was used to mix the values, an XOR operation may be used to un-mix the split value. At block 512 the critical data value is read and decrypted. The hash value of the critical data value is calculated in block 514. At block 516 the recovered hash value is compared with the calculated hash value. If the values match, as depicted by the positive branch from decision block 518, the encrypted critical data value is ready for use by the application processor. The process terminates at block 520. If the values do not match, as depicted by the negative branch from decision block 518, a tamper is detected at block 522 and the process terminates at block 524.

Those of ordinary skill in the art will recognize that the present invention has been described in terms of exemplary embodiments based upon use of non-volatile memory, such as FLASH memory and volatile memory such as RAM. However, the invention should not be so limited, since the present invention could be implemented using other types of memory.

Special purpose hardware and/or dedicated processors, general purpose computers, microprocessor based computers, digital signal processors, microcontrollers, dedicated processors, custom circuits, ASICS and/or dedicated hard wired logic may be used to construct alternative equivalent embodiments of the present invention.

The present invention, as described in embodiments herein, may be implemented using a programmed processor executing programming instructions that are broadly described above in flow chart form that can be stored on any suitable electronic storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Steps can be added and/or enhanced without departing from the present invention. Such variations are contemplated and considered equivalent.

The present invention has application, for example, for Digital Rights Management (DRM) where the critical data value is a play counter that needs to be stored and recalled. The present invention may also be used in financial applications, where the critical data value is a transaction counter.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for detecting alteration of a first data value encrypted and stored in a memory, the method comprising:

reading an encrypted data address from the memory, the data address being selected at random when the first data value was encrypted and stored in the memory;

decrypting the encrypted data address;

reading a second data value currently stored at the data address in the memory;

reading an encrypted split value from the memory, the split value being a combination of a hash value of the first data value and a third data value that was stored at the data address in the memory when the first data value was encrypted and stored in the memory;

decrypting the encrypted split value;

combining the split value and the second data value to produce a recovered hash value;

calculating a hash value of the first data value;

comparing the recovered hash value to the calculated hash value of the first data value; and determining the first data value to be altered if the recovered hash value is not equal to the calculated hash value.

2. A method in accordance with claim 1, further comprising reading the encrypted first data value from memory, decrypting it and making it available for use by the system if the recovered hash value is equal to the calculated hash value.

3. A method in accordance with claim 1, wherein the encrypted data address and the encrypted split value are updated in the memory if it is determined that the data value stored at the data address has been changed.

4. A method in accordance with claim 1, wherein decrypting the encrypted data address and decrypting the encrypted split value uses an encryption key derived from a unique identifier of a processor operable to access the memory.

5. A method in accordance with claim 4, wherein unique identifier comprises a secure laser identification number (SLID) of the processor.

6. A method in accordance with claim 1, wherein combining the split value and the second data value to produce a recovered hash value comprises performing an XOR operation between the split value and the second data value.

7. A method in accordance with claim 1, wherein data address is selected at random from a plurality of data addresses stored in a Random Access Memory of a memory interface controller coupled to the memory.

8. A secure memory system comprising:

a memory;

an encryption unit operable to receive a first data value from a processor, encrypt the first data value and store the encrypted first data value in the memory;

a hash unit operable to compute a hash value of the first data value;

a memory interface controller operable to access the memory;

a first combiner operable to combine a second data value stored at a randomly selected data address in the memory with the computed hash value of the first data value to produce a split value;

wherein the encryption unit is further operable to encrypt the split value and the randomly selected data address and store them in the memory.

9. A secure memory system in accordance with claim 8, further comprising a decryption unit operable to decrypt the encrypted split value, the encrypted data address and the encrypted first data value.

10. A secure memory system in accordance with claim 9, wherein the memory interface controller is operable to retrieve a third data value stored at the decrypted data address.

11. A secure memory system in accordance with claim 9, further comprising:

a second combiner operable to combine the third data value with the decrypted split value to produce a recovered hash value; and a comparison logic unit operable to compare recovered hash value with a computed hash value, wherein the memory system is determined to be altered if the recovered hash value is not equal to the computed hash value.

12. A secure memory system in accordance with claim 11, wherein the first and second combiners comprise an XOR unit.

13. A secure memory system in accordance with claim 8, wherein the encryption unit is further operable to receive an encryption key derived from a unique identifier of a processor operable to access the memory.

14. A secure memory system in accordance with claim 8, wherein the memory comprises a non-volatile memory.

15. A secure memory system in accordance with claim 8, wherein the memory interface controller comprises:

a random access memory buffer operable to store a plurality of data values to be stored in the memory, together with corresponding addresses;

an XOR unit operable to combine a random number with an address mask to produce a random address in the random access memory buffer; and a select unit operable to select the data value and corresponding address stored in the random access memory buffer at the random address as the second data value and the randomly selected address.

16. A secure memory system in accordance with claim 9, wherein the memory interface controller further comprises a random number generator operable to generate the random number.

17. A method for binding an encrypted first data value stored in a memory with a state of the memory, the method comprising:

selecting, at random, an address in the memory;

encrypting the address and storing it in the memory;

mixing a second data value, stored at the address, with a hash value of a first data value to produce a split value;

encrypting the split value and storing it in the memory; and encrypting the first data value and storing it in the memory.

18. A method in accordance with claim 17, further comprising updating the encrypted split value stored in the memory if the second data value is updated.

19. A method in accordance with claim 17, further comprising updating the encrypted split value stored in the memory if the first data value is updated.

* * * * *